(12) United States Patent
Kato et al.

(10) Patent No.: US 11,088,482 B2
(45) Date of Patent: *Aug. 10, 2021

(54) METALLIC MATERIAL AND CONNECTION TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Akihiro Kato, Yokkaichi (JP); Yoshifumi Saka, Yokkaichi (JP); Ryota Mizutani, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,868

(22) Filed: Nov. 26, 2019

(65) Prior Publication Data

US 2020/0235511 A1 Jul. 23, 2020

(30) Foreign Application Priority Data

Jan. 18, 2019 (JP) .............................. JP2019-007133

(51) Int. Cl.
*B32B 15/01* (2006.01)
*C22C 5/06* (2006.01)
(Continued)

(52) U.S. Cl.
CPC .............. *H01R 13/03* (2013.01); *B32B 15/01* (2013.01); *B32B 15/018* (2013.01); *B32B 15/04* (2013.01);
(Continued)

(58) Field of Classification Search
CPC ..... C23C 28/021; C23C 28/02; C23C 28/023; C23C 30/00; C23C 30/005; H01R 13/03;
(Continued)

(56) References Cited

U.S. PATENT DOCUMENTS

| 2012/0301745 A1* | 11/2012 | Kobayashi | ............... | C25D 7/00 |
| | | | | 428/656 |
| 2015/0047879 A1* | 2/2015 | Shibuya | .................. | C22C 19/03 |
| | | | | 174/126.2 |

(Continued)

FOREIGN PATENT DOCUMENTS

JP 2013-231228 A 11/2013

*Primary Examiner* — Michael E. La Villa
(74) *Attorney, Agent, or Firm* — Oliff PLC (57) ABSTRACT

A metallic material that includes a base material; and a surface layer formed on a surface of the base material and exposed on an outermost surface, wherein the surface layer contains Ag, and In less than the Ag in atomic ratio, and a connection terminal being made of the metallic material, wherein the surface layer is formed on a surface of the base material, at least in a contact portion electrically contacting an opposite electrically conductive member.

8 Claims, 6 Drawing Sheets

(51) Int. Cl.
| | |
|---|---|
| *H01B 1/02* | (2006.01) |
| *H01R 13/03* | (2006.01) |
| *B32B 15/20* | (2006.01) |
| *C23C 28/02* | (2006.01) |
| *C23C 30/00* | (2006.01) |
| *B32B 15/04* | (2006.01) |
| *C22C 27/00* | (2006.01) |

(52) U.S. Cl.
CPC ............ B32B 15/043 (2013.01); B32B 15/20 (2013.01); C22C 5/06 (2013.01); C22C 27/00 (2013.01); C23C 28/02 (2013.01); C23C 28/021 (2013.01); C23C 28/023 (2013.01); C23C 30/00 (2013.01); C23C 30/005 (2013.01); H01B 1/026 (2013.01); *B32B 2457/00* (2013.01); *Y10T 428/1291* (2015.01); *Y10T 428/12681* (2015.01); *Y10T 428/12847* (2015.01); *Y10T 428/12854* (2015.01); *Y10T 428/12875* (2015.01); *Y10T 428/12882* (2015.01); *Y10T 428/12896* (2015.01); *Y10T 428/12903* (2015.01); *Y10T 428/12917* (2015.01); *Y10T 428/12931* (2015.01); *Y10T 428/12937* (2015.01); *Y10T 428/12944* (2015.01); *Y10T 428/12951* (2015.01); *Y10T 428/12993* (2015.01)

(58) Field of Classification Search
CPC ....... B32B 15/018; B32B 15/01; B32B 15/04; B32B 15/043; B32B 15/20; B32B 2457/00; C22C 5/06; C22C 27/00; H01B 1/026; Y10T 428/12681; Y10T 428/12875; Y10T 428/12882; Y10T 428/12896; Y10T 428/12903; Y10T 428/1291; Y10T 428/12917; Y10T 428/12931; Y10T 428/12937; Y10T 428/12944; Y10T 428/12951; Y10T 428/12993; Y10T 428/12847; Y10T 428/12854
See application file for complete search history.

(56) References Cited

U.S. PATENT DOCUMENTS

| | | |
|---|---|---|
| 2015/0079422 A1 | 3/2015 | Sunaga et al. |
| 2020/0235510 A1* | 7/2020 | Mizutani .................. C22C 5/02 |

* cited by examiner

METALLIC MATERIAL AND CONNECTION TERMINAL

BACKGROUND

The present disclosure relates to a metallic material and a connection terminal. More particularly, the present disclosure relates to a metallic material having a surface layer containing Ag and In, and a connection terminal having such a surface layer in a contact portion.

In an electric connection member such as a connection terminal, an Ag layer may be provided on a surface. Ag has high electric conductivity and a high melting point, is relatively less subject to oxidizing, and can therefore be utilized as a metallic material having high heat resistance. Thus, an electric connection member having an Ag layer can be suitably used when use in a high-temperature environment or the application of high current is assumed. For example, when a connection terminal having an Ag layer on a surface is used as a connection terminal for use in an environment where temperature becomes high around an engine in an automobile or for use in a high-voltage system, it is possible to maintain a state of low contact resistance on the surface of the Ag layer, and obtain a stable electric connection characteristic, even when temperature becomes high.

However, Ag has adhesive properties, so that when an Ag layer is provided on a surface of a connection terminal or the like, the friction coefficient of the surface tends to be high. Accordingly, force required for insertion and removal becomes high in the case of a connection terminal. Thus, for example, as shown in Japanese Unexamined Patent Application Publication No. 2013-231228, reduction of the friction coefficient of an Ag layer surface is attempted by providing a hard metallic layer on the lower surface of the Ag layer. In Japanese Unexamined Patent Application Publication No. 2013-231228, an Ag—Sn alloy layer is used as a hard metallic layer.

SUMMARY

In a configuration in which an alloy layer such as an Ag—Sn alloy of Japanese Unexamined Patent Application Publication No. 2013-231228 is provided on the lower surface of an Ag layer in a metallic material, the surface of the alloy layer is covered with the Ag layer, and does not contact an opposite electric connection member, even when the alloy layer exhibits effects for characteristic improvement of the surface of the Ag layer such as reduction of a friction coefficient. Thus, the alloy layer does not directly affect the characteristics of the surface of the metallic material, such as an electric characteristic or a frictional characteristic. That is, the metallic material described above is insufficient for improvement of surface characteristics, such as reduction in a friction coefficient and contact resistance.

An exemplary aspect of the disclosure provides a metallic material and a connection terminal having a surface layer containing Ag, and being capable of achieving both low contact resistance and a low friction coefficient.

A metallic material according to the present disclosure includes a base material, and a surface layer formed on a surface of the base material and exposed on an outermost surface, wherein the surface layer contains Ag, and In less than the Ag in atomic ratio.

Here, at least part of In contained in the surface layer may be an Ag—In alloy. Moreover, the surface layer may include an Ag portion containing Ag as a main constituent, and a high-concentration In portion containing higher-concentration In than the Ag portion, and the Ag portion and the high-concentration In portion may be both exposed on the outermost surface. In this case, the Ag portion may be made of soft silver.

The content of the In in the surface layer may be 5% or more to the Ag in atomic ratio. The content of In in the surface layer may be 25% or less to the Ag in atomic ratio. A total amount of the In contained in the surface layer detected by an X-ray diffraction method may be an Ag—In alloy.

The base material may be made of Cu or a Cu alloy, and include, between the base material and the surface layer, an intermediate layer containing at least one kind selected from the group consisting of Ni, Cr, Mn, Fe, Co, and Cu.

A connection terminal according to the present disclosure is made of the metallic material as described above, and the surface layer is formed on a surface of the base material, at least in a contact portion electrically contacting an opposite electrically conductive member.

In the metallic material according to the disclosure described above, the surface layer contains In in addition to Ag. The surface layer contains a larger amount of Ag than In, and thereby, the high heat resistance and electric conductivity of Ag can be utilized as characteristics of the surface layer. On the other hand, since In is a soft metal and exhibits a solid lubricating action, the friction coefficient of the surface of the metallic material can be kept down. Moreover, In can easily break a formed oxide film by the application of a load or the like even when subjected to oxidizing. Further, the content of In is kept lower than Ag, and thereby, the influence of oxidizing of In can be kept down in the surface layer. In this way, the surface layer exposed on the outermost surface of the metallic material contains, together with Ag, In less than Ag in atomic ratio, and thereby, the whole surface layer can obtain the effect of friction coefficient reduction by In, without damaging the low contact resistance characteristic of Ag.

Here, in the case where at least part of In contained in the surface layer is an Ag—In alloy, a structure in which In less than Ag in atomic ratio is distributed in the surface layer is stably formed with ease. The Ag—In alloy exhibits a high effect in reducing the friction coefficient of the surface layer owing to the contribution of In, and has the effect of suppressing the raise of contact resistance owing to easily breakable properties of the oxide film.

Furthermore, the surface layer includes an Ag portion containing Ag as a main constituent, and a high-concentration In portion containing higher-concentration In than the Ag portion, and the Ag portion and the high-concentration In portion are both exposed on the outermost surface. In this case, characteristics such as heat resistance and low contact resistance of Ag are exerted by the Ag portion, and an effect such as friction coefficient reduction obtained by the addition of In is exerted by the high-concentration In portion. Thus, the whole surface layer easily achieves both low contact resistance and a low friction coefficient.

In this case, if the Ag portion is made of soft silver, it is possible to, because soft silver has a low content of easily oxidizable elements such as Sb in contrast to hard silver, suppress the oxidizing of these elements in the outermost surface and a rise in the contact resistance of the surface layer due to these elements when the metallic material is heated. Thus, the surface layer easily maintains a state of low contact resistance even if undergoing an environment where temperature becomes high.

In the case where the content of In in the surface layer is 5% or more to Ag in atomic ratio, the effect of friction coefficient reduction by the containing of In can be particularly increased.

In the case where the content of In in the surface layer is 25% or less to Ag in atomic ratio, the content of In can be kept in a small amount. Thereby, the rise of contact resistance resulting from the oxidizing of In is easily avoided, and the low contact resistance characteristic by Ag can be effectively utilized as characteristic of the whole surface layer.

In the case where a total amount of In contained in the surface layer detected by an X-ray diffraction method is an Ag—In alloy, a surface layer containing In less than Ag in atomic ratio is stably formed and easily maintained.

The base material is made of Cu or a Cu alloy, and includes, between the base material and the surface layer, an intermediate layer containing at least one kind selected from the group consisting of Ni, Cr, Mn, Fe, Co, and Cu. In this case, mutual diffusion of constituent elements can be suppressed between the base material and the surface layer by the intermediate layer. Therefore, when the metallic material is heated, Cu atoms constituting the base material do not easily diffuse on the surface layer and then affect the composition and characteristics of the surface layer.

In a connection terminal according to the disclosure described above, the surface layer as described above is formed at least in a contact portion. Therefore, in the contact portion, both low contact resistance and a low friction coefficient can be achieved.

BRIEF DESCRIPTION OF THE DRAWINGS

FIG. 1(a) illustrates the configuration of the whole section, and FIG. 1(b) illustrates an example of the state of a surface layer in an enlarged form.

FIG. 3(a) and FIG. 3(b) respectively indicate the element concentrations of Ag and In on a scale of 0 to 100%, and FIG. 3(c) indicates the element concentration of In on a scale of 0 to 30%.

DETAILED DESCRIPTION OF EMBODIMENTS

Hereinafter, an embodiment of the present disclosure is described in detail by use of the drawings. In the present specification, it is assumed that, unless otherwise stated, the content (concentration) of each element is indicated with an atomic ratio such as atomic percentage as a unit. Further, it is assumed that a simple metal also includes a case of containing an irreversible impurity. Unless otherwise stated, it is assumed that an alloy includes both a case of being a solid solution and a case of constituting an intermetallic compound.

[Metallic Material]

A metallic material according to one embodiment of the present disclosure is made of a stack of metallic substances. The metallic material according to one embodiment of the present disclosure may constitute any metallic member, but can be suitably utilized as a material constituting an electric connection member such as a connection terminal.

(Configuration of Metallic Material)

Figure 1:
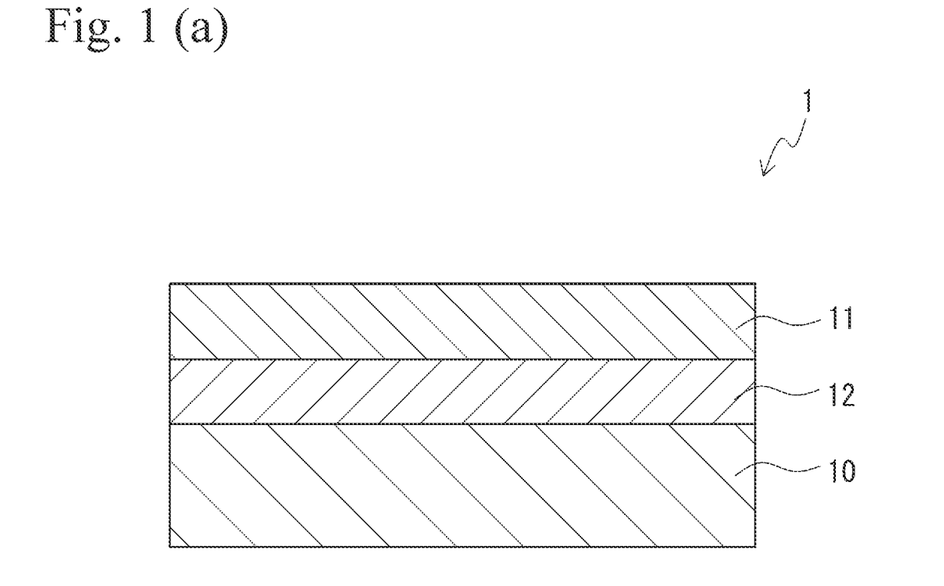
FIG. 1(a) and FIG. 1(b) is a sectional view schematically illustrating a stack structure in a metallic material according to one embodiment of the present disclosure.

FIG. 1(a) illustrates a stack structure of a metallic material 1 according to one embodiment of the present disclosure. The metallic material 1 includes a base material 10, and a surface layer 11 formed on a surface of the base material 10 and exposed on an outermost surface. As will be described later, the surface layer contains Ag and In.

Furthermore, an intermediate layer 12 can be optionally provided between the base material 10 and the surface layer 11. Moreover, a thin film (not illustrated) such as an organic layer may be provided on the surface layer 11 exposed on the outermost surface of the metallic material 1, to the extent that characteristics of the surface layer 11 are not damaged.

The base material 10 constituting the metallic material 1 is made of a metallic substance having any shape such as a plate shape. While a substance constituting the base material 10 is not particularly limited, Cu or a Cu alloy, Al or a Al alloy, Fe or an Fe alloy, or the like can be suitably used as a substance constituting the base material 10, when the metallic material 1 constitutes an electric connection member such as a connection terminal. Among others, Cu or a Cu alloy having high electric conductivity can be suitably used.

Although the intermediate layer 12 is optionally provided in contact with the surface of the base material 10, it is possible to obtain, by providing the intermediate layer 12, the effect of improving close contact between the base material 10 and the surface layer 11, the effect of suppressing mutual diffusion of constituent elements between the base material 10 and the surface layer 11, and others. As a substance constituting the intermediate layer 12, it is possible to exemplify a metallic substance containing at least one kind selected from the group (group A) consisting of Ni, Cr, Mn, Fe, Co, and Cu. The substance constituting the intermediate layer 12 may be a simple metal made of one kind selected from the group A, or may be an alloy containing one kind or two or more kinds of metallic elements selected from the group A. When made of an alloy, the substance may contain other metallic elements in addition to the metallic elements selected from the group A, but preferably contains, as a main constituent, a metallic element selected from the group A. Additionally, the intermediate layer 12 may include only one layer, or may include a stack of two or more kinds of layers.

When the base material 10 is made of Cu or a Cu alloy, the intermediate layer 12 is constituted by a metal containing, as a main constituent, a metal containing at least one kind selected from the group A described above, particularly, a metallic element selected from the group A. Thereby, even in an environment where temperature becomes high, it is possible to effectively suppress diffusion of Cu from the base material 10 to the surface layer 11, and an influence on the constituent composition and characteristics of the surface layer 11, such as consumption of In resulting from the formation of an alloy with diffused Cu. Among others, when the intermediate layer 12 is constituted by Ni or an alloy containing Ni as a main constituent, suppression of diffusion of Cu to the surface layer 11 can be effectively achieved.

The thickness of the intermediate layer 12 is not particularly limited, but is preferably 0.1 μm or more, from the viewpoint of effectively achieving suppression of diffusion between the base material 10 and the surface layer 11, and others. On the other hand, from the viewpoint of avoiding the formation of an excessively thick intermediate layer 12, the thickness of the intermediate layer 12 is preferably 3.0

μm or less. In the intermediate layer 12, part of the base material 10 side may form an alloy with the constituent element of the base material 10, and part of the surface layer 11 side may form an alloy with the constituent element of the surface layer 11.

The surface layer 11 is constituted as a metallic layer containing Ag and In. In the surface layer 11, the content of In is lower than Ag in atomic ratio. That is, In the whole surface layer 11, the content (concentration) of In is lower than the content (concentration) of Ag in atomic ratio.

The surface layer 11 may contain elements other than Ag and In, but is preferably a layer containing Ag and In as main constituents, i.e., a layer in which the sum of Ag and In accounts for 50 atomic percent or more, in order not to damage characteristics given by Ag and In, as described below. Particularly, the surface layer 11 is preferably in a form made of Ag and In alone, except for containing of an irreversible impurity, and degeneration such as oxidizing, carbonizing, nitriding, or the like in the vicinity of a surface.

As long as the surface layer 11 contains Ag, and a smaller amount of In than Ag in atomic ratio, and both Ag atoms and In atoms exist in the outermost surface, Ag and In may be distributed in the surface layer 11 in any manner. Moreover, Ag and In may each be in a state of a simple metal, or form an alloy. A part having a simple metal and a part having an alloy may coexist.

In is a metal which easily forms an alloy with Ag even at room temperature, and easily forms an Ag—In alloy, in such a case that the surface layer 11 is formed by stacking Ag layers and In layers, as will be described later. From the viewpoint of stably maintaining the state of the surface layer 11, it is preferable that at least part of In contained in the surface layer 11, favorably, major part of In contained in the surface layer 11 constitutes an Ag—In alloy. For example, as shown in the subsequent examples, a total amount detected as a phase containing In by an X-ray diffraction method (XRD) has only to be an Ag—In alloy, except for an irreversible impurity. An Ag—In alloy may be a solid solution or an intermetallic compound, but preferably forms an intermetallic compound from the viewpoint of the stability and the like of the surface layer 11.

The compositions of an Ag—In intermetallic compound that can be contained in the surface layer 11 include $Ag_3In$, $Ag_9In_4$, and $AgIn_2$. An Ag—In alloy contained in the surface layer 11 may include one kind or two or more kinds selected from these three kinds of intermetallic compounds. From the viewpoint of forming a surface layer 11 that sufficiently exhibits characteristics exerted by In, the surface layer 11 preferably includes at least either $Ag_9In_4$ or $AgIn_2$ that is relatively high in the atomic ratio of In to Ag among the three kinds described above.

The surface layer 11 may be made of an Ag—In alloy that is homogeneous as a whole. However, from the viewpoint of significantly exerting each of the characteristics given by Ag and In, the surface layer 11 preferably include, in a coexistent manner, two kinds of phases of an Ag portion 11a relatively high in the concentration of Ag, and an high-concentration In portion 11b relatively high in the concentration of In, for example, as illustrated in FIG. 1(b).

Here, the Ag portion 11a is a phase containing Ag as a main constituent, and it is possible to exemplify a form made of simple Ag (a form made of Ag and an irreversible impurity), or a form made of an Ag—In alloy containing a smaller amount of In than Ag. From the viewpoint of sufficiently exerting characteristics of Ag, the Ag portion 11a is preferably made of simple Ag. Particularly preferably, the Ag portion 11a may be made of soft silver. Soft silver has a hardness of approximately 80 Hv or less, and has a lowered content of impurity elements such as Sb having the action of raising hardness. In the Ag portion 11a, and in the whole surface layer 11, the concentration (excluding In) of impurity elements including Sb is preferably 1.0 atomic percent or less, and further, 0.1 atomic percent or less. The concentration of impurity elements including Sb may be approximately less than or equal to the limit of detection by X-ray photoelectron spectroscopy (XPS).

The high-concentration In portion 11b contains a higher concentration of In than the Ag portion 11a. Specifically, it is possible to exemplify a form made of simple In (a form made of In and an irreversible impurity), or a form made of an Ag—In alloy having a higher concentration of In (the atomic ratio of In to Ag) than the Ag portion 11a.

The Ag portion 11a and the high-concentration In portion 11b may be both made of an Ag—In alloy, in which case the high-concentration In portion 11b has an alloy composition having a higher atomic ratio of In to Ag than the Ag portion 11a. For example, when the surface layer 11 contains two kinds of intermetallic compounds $Ag_9In_4$ and $AgIn_2$, a part made of $Ag_9In_4$ can be regarded as the Ag portion 11a, and a part made of $AgIn_2$ can be regarded as the high-concentration In portion 11b. Moreover, the Ag portion 11a and the high-concentration In portion 11b may each contain two or more kinds of parts different in composition, and include, for example, a form containing both a simple metal and an alloy, and a form containing two or more kinds of alloys different in constituent composition.

When the surface layer 11 includes the Ag portion 11a and the high-concentration In portion 11b, the Ag portion 11a and the high-concentration In portion 11b may be distributed in any manner as long as both Ag atoms and In atoms exist on the outermost surface. By way of example, it is possible to produce a structure in which the Ag portion 11a in a layer shape is formed on a surface of the base material 10 (or the intermediate layer 12), and the high-concentration In portion 11b made of an Ag—In alloy is provided on a surface of the Ag portion 11a.

However, in the surface layer 11, from the viewpoint of effectively utilizing each of the characteristics of the Ag portion 11a and the high-concentration In portion 11b as the characteristic of the whole surface layer 11, the Ag portion 11a and the high-concentration In portion 11b are preferably mixed in the surface layer 11 without separating into layer shapes. In this case, the high-concentration In portion 11b tends to be in a form of being mixed so as to be distributed into the Ag portion 11a as illustrated in FIG. 1(b), reflecting the fact that a larger amount of Ag is contained in the surface layer 11 than In. Moreover, from the viewpoint of effectively utilizing each of the characteristics of the Ag portion 11a and the high-concentration In portion 11b as the characteristic on the surface of the metallic material 1, it is preferable that the Ag portion 11a and the high-concentration In portion 11b are both exposed on the outermost surface.

It is preferable that if the Ag portion 11a and the high-concentration In portion 11b are mixedly distributed in the whole region in the depth direction of the surface layer 11, the characteristics of each portion can be stably exerted. However, both the Ag portion 11a and the high-concentration In portion 11b have only to be mixedly distributed at least on the outermost surface of the surface layer 11 and in its vicinity (a surface portion). As will be described later, when Ag layers and In layers are stacked in this order and then alloyed before the surface layer 11 is formed, In tends to be distributed at a higher concentration in a part (surface portion) on the outermost surface side than in a part (inner portion) on the base material 10 side in the surface layer 11, reflecting the initial stack structure. In this case, as long as the high-concentration In portion 11b coexists with the Ag portion 11a in the surface portion as illustrated in FIG. 1(b) in the surface layer 11 formed after alloying, the ratio of the high-concentration In portion 11b may be lower in the inner portion than in the surface portion, or the Ag portion 11a alone may occupy the inner portion.

The ratio of the contents of In and Ag in the surface layer 11 has only to be suitably set according to desired characteristics of the surface layer 11. However, as will be described later in detail, from the viewpoint of effectively exerting characteristics given by In such as reduction of the friction coefficient of the surface, the content of In is preferably 5% or more in atomic ratio to Ag (In [at %]/Ag [at %]) in the whole surface layer 11 (in the sum of the Ag portion 11a and the high-concentration In portion 11b).

On the other hand, the content of In in the whole surface layer 11 is lower than Ag, but is preferably 25% or less in atomic ratio to Ag, from the viewpoint of effectively exerting characteristics given by Ag such as reduction of the contact resistance of the surface. By keeping the content of In at these values or less, the Ag portion 11a is easily formed with the constituent composition having a high concentration of Ag including simple Ag.

Containing In that is 5% or more and 25% or less in atomic ratio to Ag in the whole region in the depth direction of the surface layer 11 as described above is preferable from the viewpoint of acquiring and maintaining a stable structure and characteristics in the whole surface layer 11. However, as described above as well, In tends to be distributed at a higher concentration in the surface portion than in the inner portion in the surface layer 11 in such a case that the surface layer 11 is formed by stacking Ag layers and In layers in this order. Thus, it is preferable that In that is 5% or more and 25% or less in atomic ratio to Ag is contained at least in the outermost surface. Further, such a concentration of In may be contained in a region from the outermost surface up to a degree of depth detected by electron beam induced X-ray such as an analysis using energy dispersive X-ray spectrometry (EDX) or an electron probe microanalyzer (EPMA). Typically, it is preferable that such a concentration of In is contained in a region up to a depth of approximately 50 nm from the outermost surface.

The thickness of the whole surface layer 11 is not particularly limited, and has only to enable sufficient exertion of the characteristics given by Ag and In. For example, the thickness of the whole surface layer 11 is preferably 0.5 μm or more. On the other hand, the thickness may be 10 μm or less from the viewpoint of avoiding the formation of an excessively thick surface layer 11.

(Surface Characteristics of Metallic Material)

In the metallic material 1 according to the present embodiment, the surface layer 11 includes both Ag and In as described above, and both Ag and In exist in the outermost surface of the surface layer 11. Thus, both the characteristics given by Ag and the characteristics given by In can be utilized as the characteristics of the surface of the metallic material 1.

Specifically, high heat resistance and electric conductivity given by Ag can be utilized by containing Ag in the surface layer 11. Moreover, even if the surface layer 11 is heated, a state of high electric conductivity is easily maintained, and the surface is easily kept in a state of low contact resistance before and after heating.

On the other hand, In is a relatively soft metal, and exhibits high solid lubricating properties. Moreover, an oxide film formed on the surface is also relatively soft, and can be easily broken by the application of a load or the like. The solid lubricating properties of In and the easily breakable properties of the oxide film are exerted even in the form of an Ag—In alloy. Thus, when In is contained in the surface layer 11, the effect of friction coefficient reduction can be obtained by a solid lubricating action on the surface of the surface layer 11, and a considerable rise in contact resistance resulting from oxidizing caused by heating or the like becomes easily avoidable.

Ag exhibits high adhesive properties, and therefore has a possibility of raising the friction coefficient of the surface layer 11 by being exposed on the outermost surface of the surface layer 11. However, by containing In in the surface layer 11 together with Ag, the friction coefficient of the whole surface layer 11 can be kept down owing to the effect of friction coefficient reduction exhibited by In.

Even when oxidized by heating or the like, the surface of In or an Ag—In alloy easily maintains a state of low contact resistance owing to the easily breakable properties of the oxide film as described above. However, the surface of In or an Ag—In alloy tends to become high in contact resistance than simple Ag. Thus, if the surface layer 11 contains an excessively large amount of In, there is a possibility that low contact resistance characteristic exerted by Ag may be damaged. Accordingly, in the present embodiment, the content of In in the surface layer 11 is kept lower than Ag in atomic ratio. As a result, the low contact resistance characteristic by Ag can be suitably utilized as the characteristic of the whole surface layer 11. In this way, a smaller amount of In than Ag is contained in the surface layer 11 together with Ag, and exposed on the outermost surface of the surface layer 11. Consequently, the metallic material 1 has both a low friction coefficient, and low contact resistance before and after heating.

As described above, in the surface layer 11, Ag atoms and In atoms may be distributed in any manner as long as both Ag atoms and In atoms exist on the outermost surface. However, when the Ag portion 11a and the high-concentration In portion 11b are mixed and are both exposed on the outermost surface, surface characteristics by Ag such as low contact resistance are easily exerted strongly in the Ag portion 11a, and at the same time, surface characteristics by In such as a low friction coefficient are easily exerted strongly in the high-concentration In portion 11b. Thus, by mixing the Ag portion 11a and the high-concentration In portion 11b, both low contact resistance and a low friction coefficient before and after heating can be effectively achieved in the whole surface layer 11. From the viewpoint of exerting each of the characteristics of the Ag portion 11a and the high-concentration In portion 11b in each portion of the surface of the metallic material 1, it is preferable that the Ag portion 11a and the high-concentration In portion 11b form micro regions and are mixed together.

If the Ag portion 11a is made of soft silver, impurity elements such as Sb generally added to hard silver are not contained or are contained only at a low concentration. Consequently, a situation is less likely to occur where, when heated, the impurity elements diffuse onto the outermost surface of the Ag portion 11a, and raise contact resistance by being oxidized. Thus, if the Ag portion 11a is made of soft silver, the effect of keeping down the contact resistance of the surface layer 11 even after heating is particularly high, in addition to the effect of keeping the content of In lower than Ag. On the other hand, soft silver tends to adhere to the surface as compared with hard silver, and therefore tends to raise a friction coefficient. However, in the surface layer 11 according to the present embodiment, the high-concentration In portion 11b which effectively reduces a friction coefficient coexists with the Ag portion 11a. Thereby, a friction coefficient can be sufficiently kept down in the whole surface layer 11 even if the Ag portion 11a is made of soft silver.

As described above, because alloying of In and Ag easily progresses even at room temperature, at least part of and preferably substantially a total amount of In contained in the surface layer 11 as the high-concentration In portion 11b or the like may form an Ag—In alloy. Thereby, it becomes easy to maintain a state of the surface layer 11, such as a state where the Ag portion 11a and the high-concentration In portion 11b coexist.

Furthermore, in the surface layer 11, when an Ag—In alloy is formed, an alloy composition is not particularly limited. However, if the surface layer 11 contains an intermetallic compound having a high atomic ratio of In to Ag as in $Ag_9In_4$ or $AgIn_2$, the effect of friction coefficient reduction by In is effectively utilized with ease as the characteristics of the surface layer 11. The composition of an Ag—In alloy can be controlled by the ratio of the amounts of Ag and In used as the raw materials that form the surface layer 11, a formation condition of the surface layer 11, and others.

In the surface layer 11, if the content of In is 5% or more in atomic ratio to Ag at least on the outermost surface and in its vicinity, friction coefficient reduction by In can be particularly effectively achieved. On the other hand, if the content of In is 25% or less, the effect of contact resistance reduction brought about by Ag before and after heating can be particularly increased. The effect of suppressing a contact resistance rise due to heating can be further increased when the content of easily oxidizable impurity elements is reduced by the use of soft silver or the like, as described above.

In the present embodiment, by containing a smaller amount of In than Ag in atomic ratio in the surface layer 11 together with Ag, a friction coefficient when the surface layer 11 is slid over an opposite metallic member having an Ag layer formed on the outermost surface can be suppressed to such small values as 1.0 or less, 0.5 or less, and 0.3 or less, as shown in the subsequent examples. At the same time, contact resistance can be suppressed to such small values as 2.0 mΩ or less and 1.5 mΩ or less in a state without heating. Moreover, even after heating at 170° C. for 240 hours, contact resistance can be suppressed to such small values as 10 mΩ or less and 2.0 mΩ or less.

The metallic material 1 according to the present embodiment has a low friction coefficient on the surface and exhibits low contact resistance on the surface, and can maintain a state of low contact resistance even after heating, as described above. Thus, the metallic material 1 can be suitably utilized for the purpose of an electric component, particularly, an electric connection member, such as a connection terminal, contacting an opposite electrically conductive member on the surface of the surface layer 11.

(Manufacturing Method of Metallic Material)

The metallic material 1 according to the present embodiment can be manufactured by forming the surface layer 11 after forming the intermediate layer 12 on the surface of the base material 10 by a plating method or the like as appropriate.

The surface layer 11 may be formed by any method such as a vapor deposition method, a plating method, or a dipping method, but can be suitably formed by an electrolytic plating method. In this instance, the surface layer 11 containing Ag and In may be formed by eutectoid of Ag and In, but from the viewpoint of convenience, the surface layer 11 can be formed after Ag layers and In layers are stacked, formed, and then suitably alloyed.

Because alloying of In and Ag easily progresses even at room temperature, the surface layer 11 containing an Ag—In alloy can be formed without conducting special heating intended for alloying after an Ag layer and an In layer are formed at room temperature. The stacking order of the Ag layer and the In layer is not particularly limited. However, the surface layer 11 in which the high-concentration In portion 11b is exposed on the outermost surface together with the Ag portion 11a after alloying at room temperature is easily formed by forming an Ag layer on the lower layer, and forming an In layer on the surface of the Ag layer. The thickness of each of the Ag and In layers, and the thickness ratio between the layers have only to be suitably selected depending on the desired thickness, constituent composition, and others of the surface layer 11. However, it is possible to exemplify, as a suitable form, a form in which the thickness of the Ag layer is 0.5 to 10 μm and the thickness of the In layer is 0.05 to 0.5 μm. In the surface layer 11 to be formed, the Ag portion 11a is preferably made of soft silver, and accordingly, a material made of soft silver is also preferably utilized as an Ag layer to be a raw material. The concentration of impurity elements such as Sb contained in the Ag layer may be suppressed to the same level as a concentration desired for the Ag portion 11a in the surface layer 11.

[Connection Terminal]

A connection terminal according to one embodiment of the present disclosure is made of the metallic material 1 according to the embodiment described above, and includes the surface layer 11 containing Ag and In at least on a surface of a contact portion which electrically contacts an opposite electrically conductive member. A connection terminal is not particularly limited in specific shape and kind.

Figure 2:
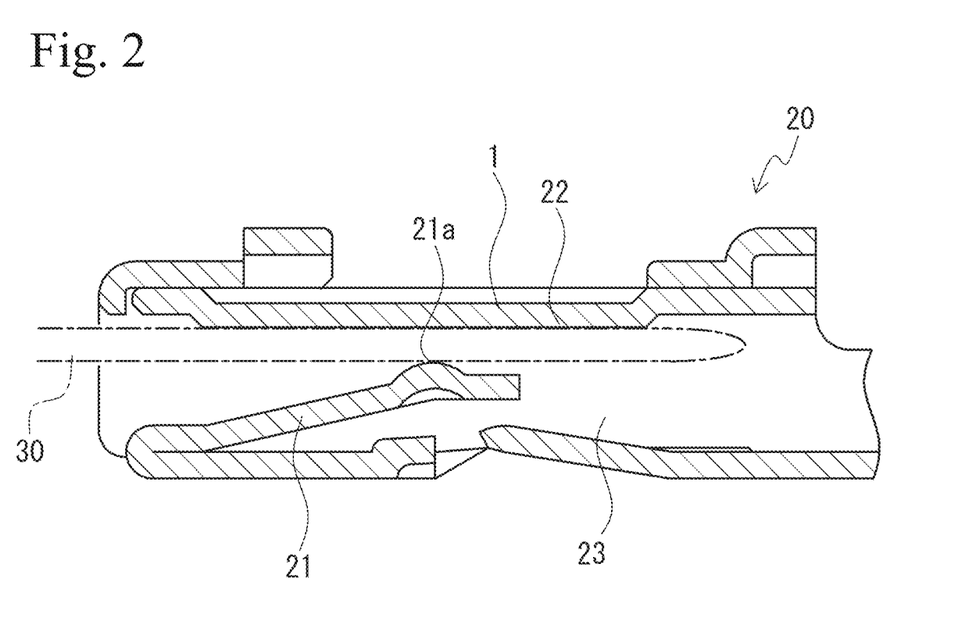
FIG. 2 is a sectional view illustrating an overview of a connection terminal according to one embodiment of the present disclosure.

A female connector terminal 20 is illustrated in FIG. 2 as an example of the connection terminal according to one embodiment of the present disclosure. The female connector terminal 20 has a shape similar to that of a publicly known fit-type female connector terminal. That is, a pressure-clamp portion 23 is formed into an rectangular cylindrical shape which is open in front, and the inner side of the bottom surface of the pressure-clamp portion 23 has an elastic contact piece 21 having an inwardly and backwardly folded shape. When a flat-plate-type tab-shaped male connector terminal 30 is inserted, as an opposite electrically conductive member, into the pressure-clamp portion 23 of the female connector terminal 20, the elastic contact piece 21 of the female connector terminal 20 contacts the male connector terminal 30 in an embossed portion 21a bulging out toward the inner side of the pressure-clamp portion 23, and applies upward force to the male connector terminal 30. The surface of a ceiling portion of the pressure-clamp portion 23 opposed to the elastic contact piece 21 serves as an inner opposed contact surface 22. The male connector terminal 30 is pressed against the inner opposed contact surface 22 by the elastic contact piece 21, and thereby pressure-clamped and held in the pressure-clamp portion 23.

The whole female connector terminal 20 is configured by the metallic material 1 having the surface layer 11 according to the embodiment described above. Here, the surface of the metallic material 1 in which the surface layer 11 is formed is directed to the inner side of the pressure-clamp portion 23, and disposed so as to configure the surfaces of the elastic contact piece 21 and the inner opposed contact surface 22 facing each other. Thereby, when the male connector terminal 30 is inserted into the pressure-clamp portion 23 of the female connector terminal 20 and then slid, both a low friction coefficient and low contact resistance are achieved in the contact portion between the female connector terminal 20 and the male connector terminal 30. Moreover, a state of low contact resistance is maintained even under heating resulting from the application of electricity or the use in a high-temperature environment.

In addition, in the form described here, the whole female connector terminal 20 is configured by the metallic material 1 according to the embodiment described above having the surface layer 11 (and the intermediate layer 12). However, the surface layer 11 (and the intermediate layer 12) may be formed in any range as long as the surface layer 11 (and the intermediate layer 12) is formed at least on the surface of the contact portion contacting an opposite electrically conductive member, i.e., on surfaces of the embossed portion 21a of the elastic contact piece 21 and the inner opposed contact surface 22. While an opposite electrically conductive member such as the male connector terminal 30 may be configured by any material, it is possible to exemplify, as a suitable form, a form in which the surface layer 11 is configured by the metallic material 1 according to the embodiment described above, or a form in which the surface layer 11 is configured by a metallic material having an Ag layer formed on the outermost surface, as in the female connector terminal 20. Moreover, a connection terminal according to an embodiment of the present disclosure can be in various forms such as a press-fit terminal which is press-fit and connected to a through-hole formed in a print-circuit board, in addition to the fit-type female connector terminal or male connector terminal as described above.

EXAMPLES

Hereinafter, the present disclosure is described in detail by use of examples. Hereinafter, unless otherwise stated, a sample is produced and evaluated in the atmosphere and at room temperature.

[Test Method]

(Production of Sample)

Raw material layers having predetermined thickness as illustrated in Table 1 were stacked on a surface of a clean Cu substrate. Specifically, first, an Ni intermediate layer having a thickness of 1.0 μm was formed by an electrolytic plating method (except for Example 2). Further, an Ag layer (soft silver) and an In layer were each formed on the surface of the intermediate layer by an electrolytic plating method.

In Examples 1 to 3, the Ag layer and the In layer were stacked one by one in this order. The thickness of the Ag layer was 1.0 μm in each example. The thickness of an In layer was 0.05 μm (Example 1) or 0.20 μm (Examples 2 and 3). An Ag layer alone was formed in a sample of Example 1, and an In layer alone was formed in a sample of Example 2.

(Evaluation of State of Surface Layer)

The distributions of constituent elements on the surface of each sample were checked by energy dispersive X-ray spectrometry (EDX) using a scanning electron microscope (SEM). Acceleration voltage was 6 kV. In this instance, detection depth was 50 nm or less. From obtained results, spatial distributions of Ag and In were evaluated, and the content of In in a surface layer was evaluated as an atomic ratio to Ag (In [at %]/Ag [at %]).

Moreover, for the samples of Examples 1 to 3, X-ray diffraction (XRD) measurement by a 2θ method was performed, and the composition and amount of a phase formed on the surface layer were evaluated. In this instance, a quantitative analysis was performed for each phase containing Ag and In on the basis of a reference-intensity-ratio (RIR) method, and the abundance ratio of each phase was estimated.

Furthermore, depth analysis X-ray photoelectron spectroscopy (XPS) measurement using $Ar^+$ sputtering was performed for the samples of Examples 1 to 3, and the distributions of the constituent elements in the surface layer in the depth direction were evaluated. Measurement was performed up to a sputter depth of 200 nm.

(Measurement of Friction Coefficient)

The friction coefficient of each sample was measured. In this instance, an emboss having a radius of 1 mm (R=1 mm) and made of a material in which an Ag-plated layer (soft silver) was formed at a thickness of 1 μm was brought into contact with the surfaces of the plate-shaped samples according to each of the examples and comparative examples. Then, in a state where a contact load of 3 N was applied, each sample was slid 5 mm at a speed of 10 mm/min. During the sliding, kinetic frictional force acting between contacts was measured by use of a load cell. Then, a value obtained by dividing kinetic frictional force by a load was a (kinetic) friction coefficient. The friction coefficient varies during sliding, and the range of the variation was recorded.

(Evaluation of Contact Resistance)

The contact resistance of each sample was measured. In this instance, an Au-plated emboss with R=1 mm was brought into contact with the surface of the plate-shaped sample according to each of the examples and comparative examples, and contact resistance was measured while a contact load of 5 N was applied. Measurement was performed by a four-terminal method. Open-circuit voltage was 20 mV, and conduction current was 10 mA.

Furthermore, each sample was heated in the atmosphere for 240 hours at 170° C. After the sample was left and cooled to room temperature, contact resistance was measured as described above.

[Test Results]

(State of Surface Layer)

Figure 3:
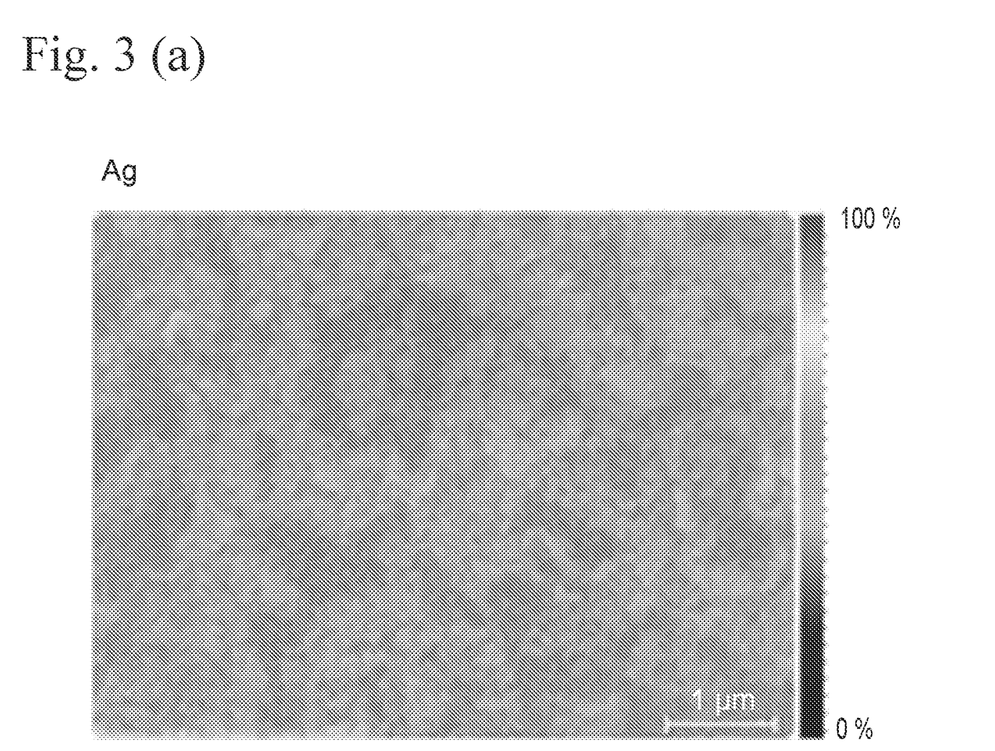
FIG. 3(a), FIG. 3(b), and FIG. 3(c) illustrates distributions of Ag and In obtained by EDX, with regard to a sample according to Example 1.

The distributions of Ag and In obtained by EDX are shown in FIG. 3(a) and FIG. 3(b) respectively indicate the element concentrations of Ag and In on a scale of 0 to 100%, and (c) indicates the element concentration of In on a scale of 0 to 30%. In (a), regions in which the concentration of Ag is high are indicated in dark gray (orange in a color image). On the other hand, in (b) and (c), regions in which the concentration of In is high are indicated in light gray (bright blue in a color image).

Furthermore, for each of the examples and comparative examples, the thickness of each raw material layer, the content of In obtained by EDX, and the kinds and abundance ratios (mass percent) of formation phases obtained by XRD are arranged in Table 1. In addition, phases other than those illustrated in Table 1 were not detected as phases containing Ag and/or In by XRD.

Figure 4:
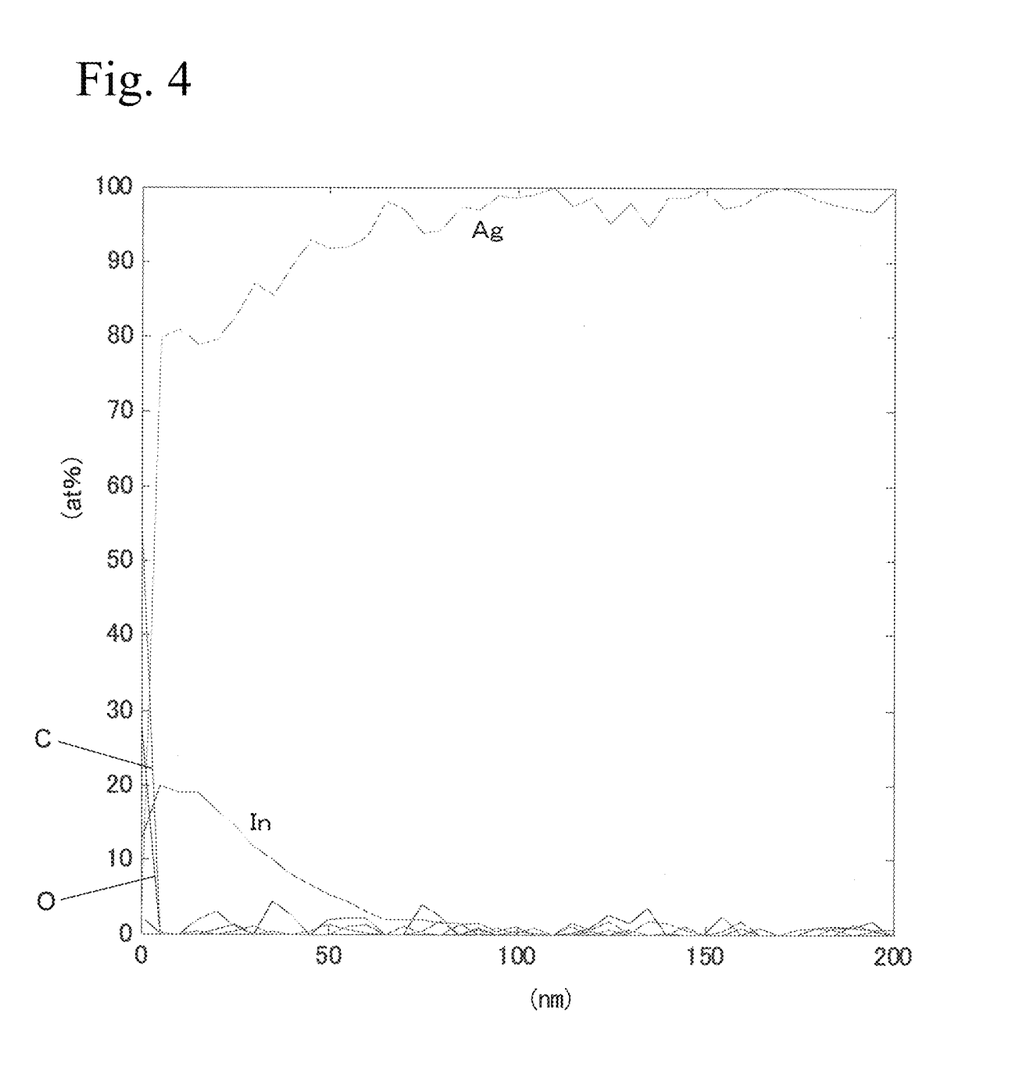
FIG. 4 illustrates the depth distribution of each element with regard to the sample according to Example 1.

Furthermore, the depth distributions of existent elements evaluated by depth analysis XPS measurement are illustrated in FIG. 4 for the sample of Example 1. In the samples of all the examples, elements other than those indicated in the graph of FIG. 4 were not detected by XPS at a concentration equal to or more than a detection limit (0.1 to 1.0 atomic percent), and Ni derived from an intermediate layer, Cu derived from a base material, and impurity elements such as Sb were not observed in a region up to a depth of 200 nm.

TABLE 1

| | Raw material layer (μm) | | | | |
|---|---|---|---|---|---|
| | Ag layer | In layer | Ni layer | In content (Ag ratio; %) | Formation phase |
| Example 1 | 1.0 | 0.05 | 1.0 | 6.7 | Ag (52%), $Ag_9In_4$ (48%) |
| Example 2 | 1.0 | 0.20 | — | 20.3 | Ag (2%), $Ag_9In_4$ (98%) |
| Example 3 | 1.0 | 0.20 | 1.0 | 33.3 | $Ag_9In_4$ (15%), $AgIn_2$ (85%) |
| Comparative Example 1 | 1.0 | — | 1.0 | 0 | Ag |
| Comparative Example 2 | — | 0.20 | 1.0 | 100 | — |

From the results of the analyses of element distributions by EDX, and the formation phases by depth analysis XPS and XRD described above, it is recognized that, in each of Examples 1 to 3, a surface layer containing both Ag atoms and In atoms is formed, and Ag atoms and In atoms both exist in the outermost surface. Further, from the element distribution by EDX in FIG. 3(a), FIG. 3(b), and FIG. 3(c), it is found that a region (Ag portion) having a high Ag concentration and a region (high-concentration In portion) having a high In concentration are mixed, and then exposed on the outermost surface.

In the result of depth analysis XPS in FIG. 4, the ratio of In to Ag gradually decreases from the outermost surface toward the inner side. Further, all the phases containing In observed by XRD are an Ag—In alloy. That is, it is found that In is mainly distributed as a high-concentration In portion at a relatively shallow position of the surface layer including the outermost surface, in the form of an Ag—In alloy.

In Table 1, between Example 1 and Example 3, the thickness of the In layer as the raw material layer is larger in Example 3, and the content of In in the surface layer to be formed increases accordingly. In Example 2, no Ni layer is provided, and Ag layers and In layers having the same thickness as those in Example 3 are stacked, but the content of In in the surface layer to be formed is lower than that in the case of Example 3. This can be interpreted as being attributed to the fact that, when no Ni intermediate layer is provided, In forms an alloy with Cu derived from the substrate is then segregated, and the amount of In constituting the surface layer decreases, whereas the consumption of In resulting from the diffusion of Cu and the associated formation of an alloy with Cu is suppressed by providing an Ni intermediate layer.

In this way, according to the thickness of the In layer as the raw material layer, and the presence or absence of an Ni layer, the content of In in the formed surface layer increases in the order of Examples 1, 2, and 3. Then, along with the increase of the In content, a phase of an intermetallic compound in which the atomic ratio of In to Ag is high as in Ag→$Ag_9In_4$→$AgIn_2$ comes to be formed as a formation phase, and the ratio of this phase is high. Particularly, in Examples 1 and 2 in which the In content is 25% or less, the Ag portion made of simple Ag coexists with the high-concentration In portion made of an Ag—In alloy, whereas in Example 3 in which the In content is more than 25%, no Ag portion made of at least simple Ag is formed, and $Ag_9In_4$ which is an Ag—In alloy having a relatively low content of In is formed as a phase that can be regarded as an Ag portion.

As seen in the measurement results of the element distributions in FIG. 4, In is distributed at a high concentration in the vicinity of the surface of the surface layer in the sample according to each example, and the concentration of Ag is high inside the surface layer. In the example of FIG. 4, substantially Ag alone is detected in a region deeper than approximately 100 nm. This shows that, in the surface layer, the high-concentration In portion is mostly distributed in shallow regions, and the Ag portion is mostly distributed in deep regions.

(Characteristics of Surface Layer)

For each of the examples and comparative examples, measurement results of contact resistance before and after high-temperature leaving, and measurement results of friction coefficients are illustrated together with the thickness of each raw material layer and the In content.

TABLE 2

| | Raw material layer (μm) | | | | Contact resistance (mΩ) | | |
|---|---|---|---|---|---|---|---|
| | Ag layer | In layer | Ni layer | In content (Ag ratio; %) | Initial state | After high-temperature leaving | Friction coefficient |
| Example 1 | 1.0 | 0.05 | 1.0 | 6.7 | 1.4 | 1.0 | 0.2 to 0.3 |
| Example 2 | 1.0 | 0.20 | — | 20.3 | 0.8 | 1.5 | 0.2 to 0.6 |
| Example 3 | 1.0 | 0.20 | 1.0 | 33.3 | 1.0 | 7.1 | 0.3 to 0.45 |
| Comparative Example 1 | 1.0 | — | 1.0 | 0 | 0.8 | 1.4 | 0.5 to 1.5 |
| Comparative Example 2 | — | 0.20 | 1.0 | 100 | — | >20 | 0.15 to 0.25 |

First, when the measurement results of contact resistance are viewed, extremely low contact resistance is obtained both in the initial state and after high-temperature leaving, reflecting the electric conductivity and the high heat resistance of Ag, in Example 1 in which the surface layer is formed by Ag alone. In contrast, in all the samples of Examples 1 to 3 in which the surface layer containing Ag and In is formed, contact resistance in the initial state is suppressed to a degree slightly higher than that in the case of Comparative Example 1. Further, contact resistance after high-temperature leaving is suppressed to a value smaller than or substantially equal to that that in the case of Example 1, in Examples 1 and 2. In Example 3, contact resistance after high-temperature leaving is higher than that in Examples 1 and 2, but is far smaller in value when compared with Example 2 in which the surface layer is made of In alone, and the sample is sufficiently usable as a connection terminal.

In this way, by forming a surface layer containing Ag, and a smaller amount of In than Ag in atomic ratio, low contact resistance is obtained as the effect by the characteristics of Ag in the initial state at room temperature, and a significant rise of contact resistance can be suppressed even when heating to a high temperature is performed. Moreover, the content of In in the surface layer is lower in the order of Examples 3, 2, and 1, and contact resistance after high-temperature leaving is also lower accordingly. In Examples 1 and 2 in which the content of In is 25% or less, extremely low contact resistance is obtained both before and after high-temperature leaving, and it can be said that characteristics closer to those in the case of simple Ag in Example 1 are obtained. In Example in which the content of In is lowest, contact resistance after high-temperature leaving is lower than that in the initial state, but this is considered to be attributed to the influence of the diffusion of In to a parent material side due to high-temperature leaving, and the decrease of the In concentration in the surface layer from the initial concentration.

Next, when friction coefficients are viewed, the friction coefficient is high due to the adhesive properties of Ag in the case of Example 1 in which the surface layer is formed by Ag alone. The variation of values during sliding is also great. In contrast, in each of Examples 1 to 3 in which the surface layer containing Ag and In is formed, a low friction coefficient less than or equal to half of that in Example 1 is obtained. The variation of values caused by sliding is also smaller. In each example, the value and variation of the friction coefficient are decreased to levels approximate to those in the case of Comparative Example 2 in which the surface layer is made of In alone. That is, in each example, the rise of the friction coefficient due to the adhesive properties of Ag can be considerably suppressed by the effect of solid lubricating properties exerted by In, even though only a smaller amount of In than Ag is added.

From the above, it is obvious that, by forming, on a surface of a metallic material, a surface layer containing, in addition to Ag, a smaller amount of In than Ag, a rise of a friction coefficient resulting from the adhesion of Ag can be effectively suppressed while the characteristics of Ag that give a state of low contact resistance before and after heating are maintained. Particularly, satisfactory characteristics close to those of simple Ag can be obtained with regard to contact resistance before and after heating by suppressing the content of In to 25% or less in the atomic ratio to Ag.

While the embodiment of the present disclosure has been described in detail above, the present disclosure is not at all limited to the embodiment described above, and various alterations can be made without departing from the spirit of the present disclosure.

What is claimed is:

1. A metallic material comprising:
   a base material; and
   a surface layer formed on a surface of the base material and exposed on an outermost surface, wherein
   the surface layer contains both Ag and In, wherein In is present less than the Ag in atomic ratio, and wherein
   the surface layer includes an Ag portion containing Ag as a main constituent and optionally In, and a high-concentration In portion containing a higher-concentration of In than in the Ag portion, and the Ag portion and the high-concentration In portion are both exposed on the outermost surface.

2. The metallic material according to claim 1, wherein at least part of the In contained in the surface layer is an Ag—In alloy.

3. The metallic material according to claim 1, wherein the Ag portion is made of soft silver.

4. The metallic material according to claim 1, wherein (In/Ag) is 0.05 or more.

5. The metallic material according to claim 1, wherein (In/Ag) is 0.25 or less.

6. The metallic material according to claim 1, wherein a total amount of the In contained in the surface layer detected by an X-ray diffraction method is an Ag—In alloy.

7. The metallic material according to claim 1, wherein the base material is made of Cu or a Cu alloy, and
   includes, between the base material and the surface layer, an intermediate layer containing at least one kind selected from the group consisting of Ni, Cr, Mn, Fe, Co, and Cu.

8. A connection terminal being made of the metallic material according to claim 1, wherein the surface layer is formed on a surface of the base material, at least in a contact portion electrically contacting an opposite electrically conductive member.

\* \* \* \* \*